United States Patent [19]

Hall

[11] Patent Number: 5,389,459

[45] Date of Patent: Feb. 14, 1995

[54] DISTRIBUTED ENERGY SYSTEM

[76] Inventor: John C. Hall, 18334 Montpere Way, Saratoga, Calif. 95070

[21] Appl. No.: 181,846

[22] Filed: Jan. 14, 1994

[51] Int. Cl.⁶ .......................................... H01M 12/08
[52] U.S. Cl. ...................... 429/101; 429/210
[58] Field of Search ............... 429/101, 17, 19, 13, 429/50, 25, 210, 72

[56] References Cited

U.S. PATENT DOCUMENTS

| | | | |
|---|---|---|---|
| 2,914,595 | 11/1959 | Darland, Jr. et al. | |
| 3,669,744 | 6/1972 | Tsenter et al. | |
| 3,850,694 | 11/1974 | Dunlop et al. | 136/86 |
| 4,105,829 | 8/1978 | Venero | 429/15 |
| 4,127,703 | 11/1978 | Holleck | 429/57 |
| 4,128,701 | 12/1978 | Maricle | 429/21 |
| 4,129,683 | 12/1978 | Maricle | 429/21 |
| 4,565,749 | 1/1986 | van Ommering et al. | 429/27 |
| 4,820,597 | 4/1989 | Lim et al. | 429/50 |
| 5,082,754 | 1/1992 | Jones | 429/101 |
| 5,229,222 | 7/1993 | Tsutsumi et al. | 429/19 |

*Primary Examiner*—Anthony Skapars
*Attorney, Agent, or Firm*—Perman & Green

[57] ABSTRACT

A metal oxide-hydrogen battery system comprises a first enclosed vessel containing a battery cell. A second enclosed vessel is remote from the first vessel and contains a solid state metal hydride capable of sublimating hydrogen gas-to thereby develop a pressure within said second vessel in the range of approximately 1 to 10 psig. A conduit provides communication between the first compartment and the second compartment and a valve is provided for controlling the flow of hydrogen gas to the first vessel from the second vessel. In another embodiment, the battery may be of a bipolar design.

5 Claims, 2 Drawing Sheets

DISTRIBUTED ENERGY SYSTEM

BACKGROUND OF THE INVENTION

1. Field of the Invention

This invention relates generally to nickel-hydrogen storage cells, and, more particularly, to the use of such cells in which the hydrogen gas is stored as a metal hydride at a location remote from the storage cell and can be selectively dispensed to the storage cell.

2. Description of the Prior Art

Rechargeable cells or batteries are electrochemical devices for storing and retaining an electrical charge and later delivering that charge for useful power. A familiar example of the rechargeable cell is the lead-acid cell used in automobiles. Another type of cell having a greater storage capacity for its weight is the nickel oxide pressurized hydrogen cell, an important type of which is commonly called the nickel-hydrogen cell and is used in spacecraft applications.

The nickel-hydrogen cell includes a series of active plate sets which store a charge electrochemically and later deliver that charge as a useful current, packaged within a pressure vessel that contains the electrolyte, the plate sets, and the hydrogen gas that is an essential active component of the cell. A nickel-hydrogen storage cell delivers current at about 1.3 volts, and a number of the cells are usually connected in series to produce current at the voltage required by the systems of the spacecraft.

A nickel-hydrogen cell as typically used in a satellite is periodically charged by electrical current produced by solar panels on the spacecraft when the satellite is in sunlight, and then later discharged to supply electrical power, when the spacecraft is in shadow or peak electrical power is demanded.

Each cell has a positive (during discharge), nickel-containing electrode, consistently designated as "cathode" herein, spaced from a hydrogen-containing negative (during discharge) electrode consistently designated as "anode" herein. The electrodes generally have the form of spaced plates separated by a porous inert sheet, such as zirconium oxide cloth, asbestos, polypropylene or nylon, which acts as a separator matrix for electrolyte extending between the two electrodes. The separator matrix sheet is sufficiently thick to prevent short circuit contact between the electrodes and holds a sufficient quantity of electrolyte for desired cell performance. The electrolyte is an alkaline medium, preferably an aqueous solution of alkali metal hydroxide, more particularly thirty percent potassium hydroxide solution. The hydrogen-containing electrode is a plastic bonded, metal powder or carbon or catalyzed carbon plate. The metal is preferable platinum, but may comprise other materials which will catalyze hydrogen oxidation reactions in aqueous electrolyte media and is backed by a plastic, preferably tetrafluoroethylene (e.g., Dupont's Teflon brand materials), mesh element which accommodates gas diffusion. The cathode material is a nickel-oxy-hydroxide. Electrode pairs are generally arrayed with their cathodes back to back. External contact to the electrodes is generally made by nickel. Hydrogen within the pressure vessel, generally maintained at a superatmospheric pressure of 20–100 atmospheres, diffuses through the gas diffusion mesh of Teflon or the like to reach the catalytic anode where the discharge mode anode reaction, (I) $\frac{1}{2} H_2 + OH^- \rightarrow H_2O + e^-$ occurs, in balance with the corresponding cathode reaction, (II) $NiOOH + H_2O + e^- \rightarrow Ni(OH)_2 + OH^-$ providing an overall discharge reaction, (III) $NiOOH + \frac{1}{2} H_2 \rightarrow Ni(OH)_2$, The reverse of such reactions occur on charging.

Safety problems with batteries are in part due to the mixing of the active positive and negative materials within a single container. In this view gasoline is fundamentally less dangerous than a battery as oxygen is not present in large amounts inside the tank. The intimate mixing of positive and negative materials inside a battery container is in the view of conventional wisdom required to provide adequate power density and to maximize volumetric energy density. As to the former, batteries with thicker electrodes are viewed as safer but must operate at higher current densities to produce an equivalent power. As to the latter, the more closely packed the battery materials are the higher will be the volumetric energy density.

One exception to the above approach is found in flow batteries such as zinc bromine and zinc chloride. In this case the positive reactants must be stored external to the battery stack. They are introduced into the battery stack by means of mechanically complex pumps. Typical of this general construction are the U.S. Pat. Nos. to Maricle, 4,129,683 and 4,128,701 in which hydrogen and chlorine are pumped from storage tanks to their respective chambers of a regeneration fuel cell.

Various disclosures are known of nickel hydrogen electrical storage cells contained within suitable pressure vessels. Such disclosures include the U.S. Pat. Nos. to Lim et al., 4,820,597; to van Ommering et al., 4,565,749; to Holleck, 4,127,703; and to Tsenter et al., 3,699,744.

In U.S. Pat. No. 3,850,694 to Dunlop et al., a nickel hydrogen fuel cell containing lanthium nickel is initially charged with hydrogen gas to thereby form lanthium nickel hydride after which the filling tube is permanently closed off. In this manner, hydrogen is stored as a reduced compound rather than as a gas at higher pressures.

Another pertinent patent, U.S. Pat. No. 5,082,754 to Jones, discloses a metal oxide-hydrogen battery which comprises an outer cylindrical shell and a battery cell disposed centrally within the shell. Additionally, a pair of sealed spherical tanks are located in the ends of the shell on either side of the cell and each spherical tank contains pressurized hydrogen. An opening provides communication between the cylindrical shell and each of the spherical tanks and a remotely controlled valve acts to open and close the openings. Opening of the valve permits hydrogen gas to contact the cell to generate an electron current in an exterior circuit. During recharging of the cell, hydrogen generated in the cell passes into the spherical tanks and is captured therein by closing of the valves so as to minimize self-discharge of the battery cell during standby periods. In short, the Jones patent teaches a hydrogen storage vessel as a structural part of a battery.

It was in light of the prior art as just described that the present invention was conceived and has now been reduced to practice.

SUMMARY OF THE INVENTION

In its broad concept, the present invention relates to a metal oxide-hydrogen battery system which comprises a first enclosed but unpressurized vessel containing a battery cell. A second enclosed vessel is remote from the first vessel and contains a solid state metal hydride capable of sublimating hydrogen gas to thereby develop a pressure within the second vessel in the low pressure range of approximately 1 to 10 psig. A conduit provides communication between the first compartment and the second compartment and a valve is provided for selectively controlling the flow of hydrogen gas to the first vessel from the second vessel. In another embodiment, the battery may be of a bipolar design.

Nickel hydrogen is an example of a classical battery in which the active materials are stored in a common vessel. A separate hydrogen storage container offers significant advantages which have not been previously realized with respect to safety and volumetric energy density in applications such as an electric vehicle. Separate storage of hydrogen outside of the cell stack is intrinsically safer as it limits the maximum energy available in the event of a sudden battery failure. In addition, such a construction allows, through distribution of the hydrogen in numerous containers, to (a) further limit the amount released by a failure and (b) take advantage of normally unutilized spaces within the vehicle for small hydrogen tanks. This latter benefit has the net effect of increasing volumetric energy density. A particular advantage of this approach which also has not been previously realized is that no pumps are required since the hydrogen is under pressure with a pressure differential created by the charge/discharge process.

Another feature of the invention concerns the bipolar battery. In this instance, it is desirable to exclude hydrogen to prevent leak current in the battery which not only self discharges the battery but may lead to capacity imbalance between the cells and possibly hazardous redox reactions.

Yet another feature of the invention is the additional advantage of creating a pseudo hydrogen limited battery. During periods of storage of high rate nickel oxide hydrogen batteries, it has been found that the batteries suffer irreversible capacity loss if stored with a charge of hydrogen gas. This is sometimes referred to as "hydrogen sickness". The solution to this problem in present nickel oxide hydrogen batteries is limit the amount of hydrogen and thereby make the battery intrinsically nickel oxide limited. The problems with this approach are (a) it requires that the battery be fully discharged prior to storage and (b) it penalizes the battery energy density by limiting the lightest electrode. In the present invention, these problems are overcome by separately storing the hydrogen. Thus a pseudo hydrogen limited design can be created whenever the battery is not in use by closing the valve and discharging only the hydrogen in the battery contained. Note that this use prefers low pressure hydrogen as less hydrogen capacity exists in the battery container.

Another advantage of the invention is that the hydrogen is stored at low pressure and thus does not present a safety hazard due to (a) containment of a high pressure gas and (b) in the event of an accidental rupture, of the tank there will not be an instantaneous release of all the flammable hydrogen in the battery.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate two of the embodiments of the invention, and, together with the description, serve to explain the principles of the invention in general terms. Like numerals refer to like parts throughout the disclosure.

DETAILED DESCRIPTION OF THE PREFERRED EMBODIMENTS

Figure 1:
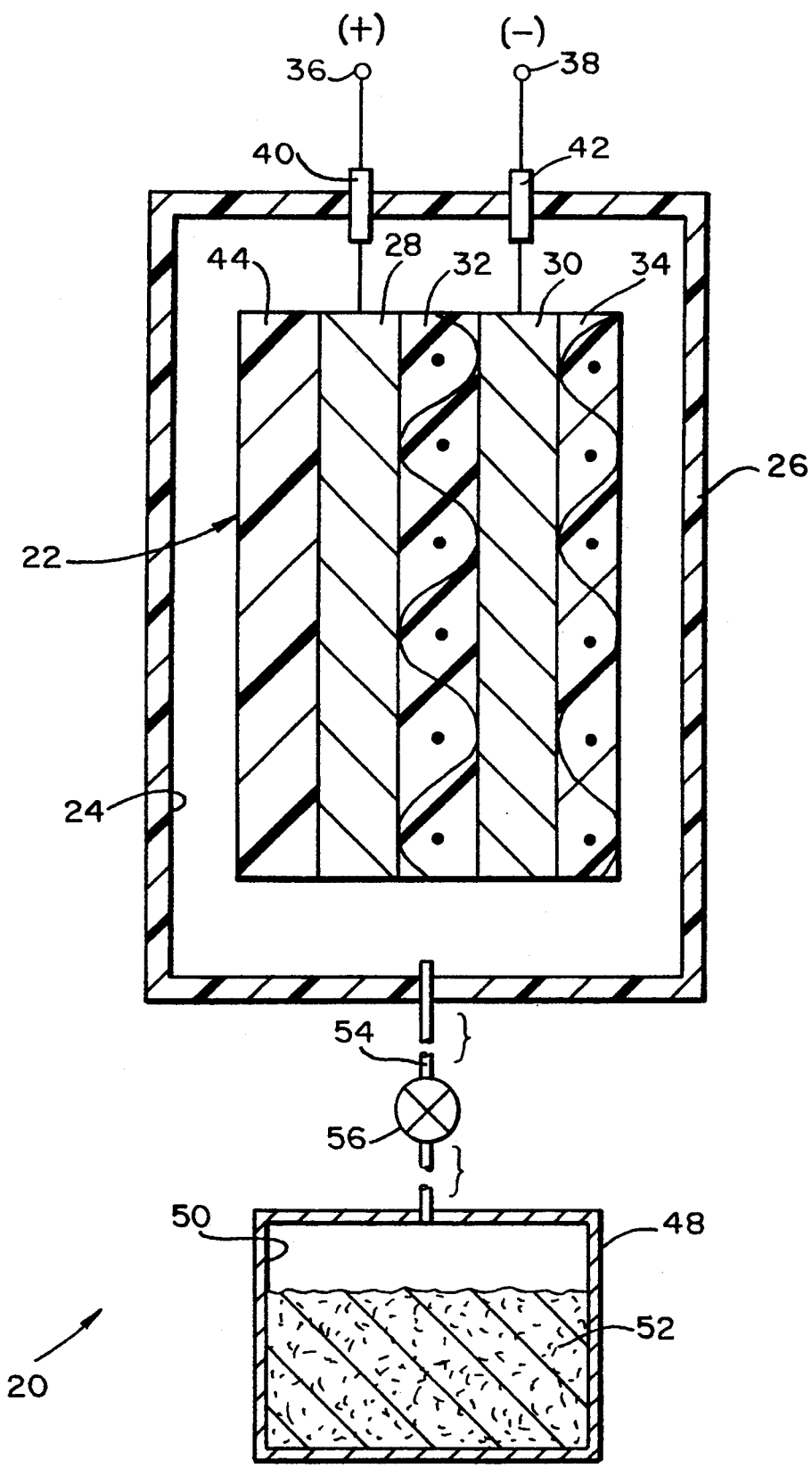
FIG. 1 is a cross section diagrammatic view of a battery made in accordance with a first embodiment of the invention.

Referring now to FIG. 1, there is shown at 20 a first embodiment of a battery system according to the invention wherein a unit cell 22 which may be one of an array of cells is disposed within the enclosed compartment 24 of a vessel 26. The vessel 26 is preferably composed of an electrically nonconductive material.

The unit cell 22 comprises a positive plate (during discharge) cathode 28 opposing an anode 30 and separated by a porous inert sheet (separator matrix) 32 typically composed of zirconia. The plate 29 is preferably a sintered nickel structure, impregnated with electroactive material, commonly characterized by the formula, $NiOOH$, and has a form and thickness commonly used both in nickel-cadmium batteries and in state-of-the-art nickel-hydrogen batteries. The anode 30 is made of Teflon-bonded platinum powders on a current carrying nickel support screen to provide good conductivity. Adjacent to the anode is a plastic mesh or screen 34 which provides a gas space allowing easy diffusion of hydrogen between the anode 30 and the surrounding atmosphere. Between the gas screen and the negative electrode is a porous layer of PTFE which acts to "wet proof" the back of the electrode while allowing the passage of hydrogen gas. The surrounding atmosphere is at ambient pressure.

The cathode and anode 28 and 30, respectively, are connected to plus and minus terminals 36 and 38, respectively, via feed-throughs 40, 42 in the vessel 26. In contact with the nickel oxi-hydroxide cathode 28, a reservoir matrix 44 may be included which may be of porous organic or inorganic material including ceramics and porous metal structures.

Remote from the vessel 26 is a second vessel 48 which defines an enclosed compartment 50 containing a solid state metal hydride capable of sublimating hydrogen gas. Lanthium nickel hydride and ferrous titanium hydride are examples of a large number of metal hydrides which are suitable for purposes of the invention. By means of a sublimation process, pressure is developed within the compartment 50 in the range of approximately 1 to 10 psig. A suitable conduit 54 extends between the vessels 26 and 48 so as to provide communication between the compartments 24 and 50. A selectively operable valve 56 is movable between open and closed positions to control the flow of hydrogen gas from the compartment 50 to the compartment 24.

During normal charge and discharge of the battery, the valve 56 is in the open position. When the battery is not in use, the valve is closed to limit self discharge (direct reaction of all the hydrogen with charged nickel active material). Furthermore, during periods of extended inactivity, closing the valve creates a pseudo positive recharge design which is believed to prevent capacity fading.

Significant benefits accrue from the construction just described. First, storage of hydrogen substantially in solid form at a location remote from a primary battery cell significantly increases the safety of the system. Furthermore, the vessel 48 need not be capable of withstanding high internal pressures and may be shaped to conform to any desired configuration. For example, should the battery system 20 be intended for a vehicle, it can more readily be tailored to conform to the spaces already available within the vehicle without requiring special attention for accommodating high pressure vessels whose shapes are much more restricted. Additionally, no pumps are required since the hydrogen is under pressure, albeit low pressure, by reason of the pressure differential created by the charge/discharge process.

Figure 2:
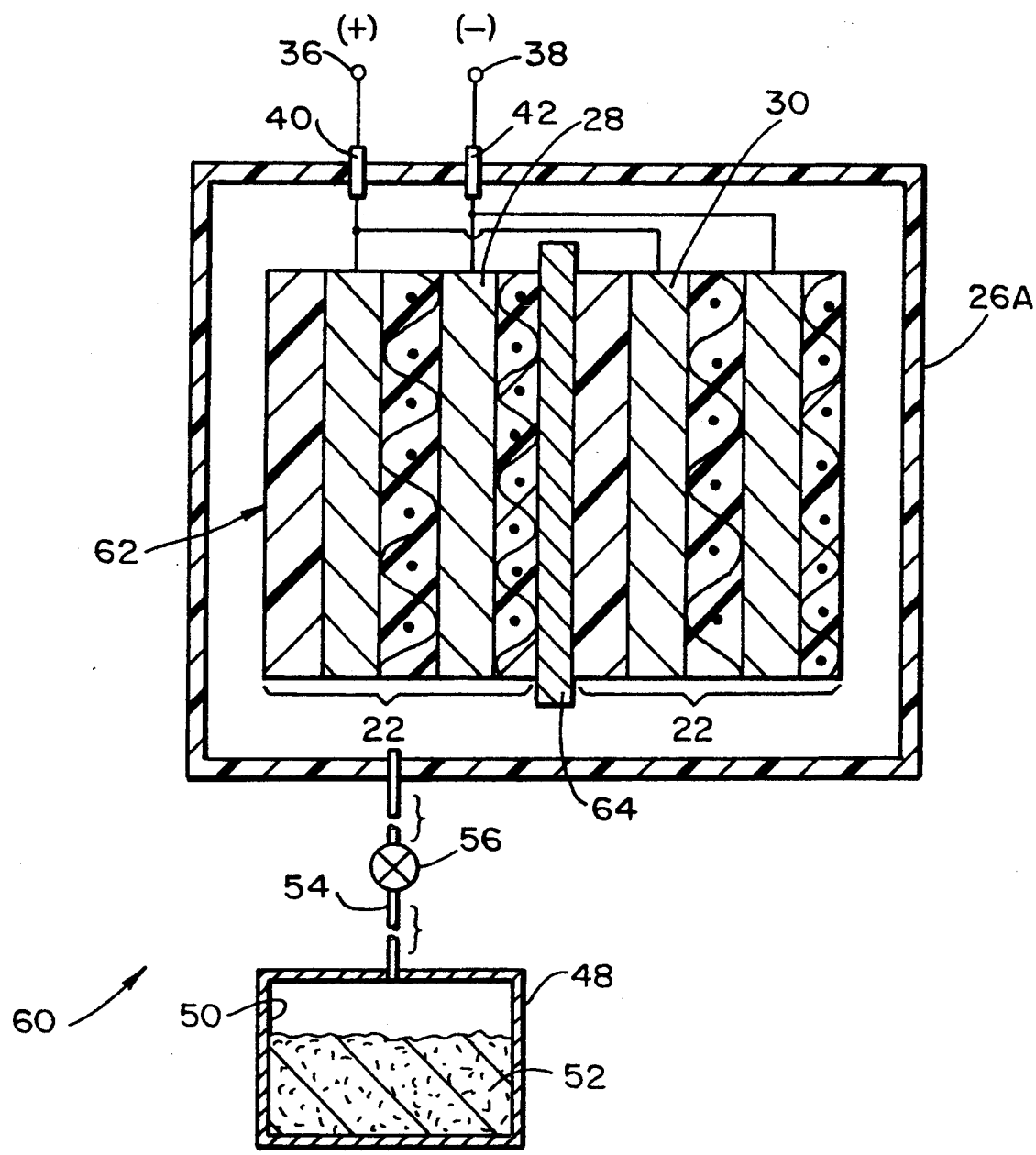
FIG. 2 is a cross section diagrammatic view of a battery made in accordance with a second embodiment of the invention.

On charging or discharging, the battery hydrogen may be freely formed or consumed by the battery. However, the metal hydride forming alloy will up to its stoichiometric limit maintain an H$_2$ vapor pressure of 1–10 psi. Below the stoichiometric limit (approximately 1.5 weight percent for FeTi) it in effect buffers the pressure. Turn now to FIG. 2 for another embodiment of the invention. In this instance, a battery system 60 includes a bipolar cell array 62 is provided within a modified vessel 26A although otherwise the system is generally similar to that illustrated in FIG. 1. A bipolar battery design is one in which the interconnect between adjacent series cells 22 is a conductive wall 64 between electrodes of opposite polarity in the two sequential cells. As seen in FIG. 2, the cathode 28 and anode 30 are so positioned. The conductive wall 64 covers essentially the whole of the facing surfaces of the two electrodes and operates to conduct electric current from one cell 22 to the next in a series arrangement. The wall 64 thereby eliminates the need for cell interconnecting bus bars. The conductive wall 64 also seals the electrolyte inside the individual cells. Intercell electrolyte leakage would otherwise complete the cell circuit and short circuit the battery.

The bipolar approach is attractive for the design of high power, high energy density and low cost battery designs. There is essentially no external lead loss which derates normal battery power. Furthermore, the continuous conductive wall 62 minimizes terminal effects which lead to current density gradients in monopolar electrode designs such as indicated in FIG. 1. These gradients, in turn, can reduce battery capacity, and energy density, as utilization of active material in general decreases as current density increases. Also, the absence of external bus bars simplifies electrode and battery design thereby reducing both cost and weight.

In all other respects, the construction and operation of the battery system 60 is similar to that of the system 20.

While preferred embodiments of the invention have been disclosed in detail, it should be understood by those skilled in the art that various other modifications may be made to the illustrated embodiments without departing from the scope of the invention as described in the specification and defined in the appended claims.

I claim:

1. A metal oxide-hydrogen battery system comprising:
    a first vessel having a first enclosed compartment;
    battery cell means disposed in said first vessel;
    a second vessel remote from said first vessel having a second enclosed compartment containing a solid state metal hydride capable of sublimating hydrogen gas to thereby develop a pressure within said second vessel in the range of approximately 1 to 10 psig;
    conduit means providing communication between the first compartment and the second compartment; and
    valve means for controlling the flow to said first vessel of hydrogen gas from the second vessel.

2. A metal oxide-hydrogen battery system as set forth in claim 1 wherein said battery cell means includes:
    a nickel oxi-hydroxide cathode plate;
    a hydrogen anode plate;
    a separator containing a liquid electrolyte disposed between and extending from the anode plate to the cathode plate; and
    a hydrogen ambient atmosphere which is accessible to the anode plate, so that said electrolyte provides a conductive path between said cathode plate and said anode plate and energy conversion is effected through charge and discharge in accordance with the simplified reversible overall equation,

$$\mathrm{NiOOH} + \tfrac{1}{2}\,\mathrm{H}_2 \rightleftharpoons \mathrm{Ni(OH)}_2.$$

3. A metal oxide-hydrogen battery system as set forth in claim 1 wherein said first vessel is composed of an electrically non-conductive material.

4. A metal oxide-hydrogen battery system as set forth in claim 1 wherein said battery cell means is bipolar.

5. A metal oxide-hydrogen battery system as set forth in claim 1 wherein said battery cell means includes:
    first and second battery cells, each of said battery cells including:
        a nickel oxi-hydroxide cathode plate;
        a hydrogen anode plate;
        a separator containing a liquid electrolyte disposed between and extending from the anode plate to the cathode plate; and
        a hydrogen ambient atmosphere which is accessible to the anode plate, so that said electrolyte provides a conductive path between said cathode plate and said anode plate and energy conversion is effected through charge and discharge in accordance with the simplified reversible overall equation,

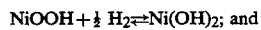

$$\mathrm{NiOOH} + \tfrac{1}{2}\,\mathrm{H}_2 \rightleftharpoons \mathrm{Ni(OH)}_2;\ \text{and}$$

wherein said battery cell means includes a conductive wall between said cathode plate for said first battery cell and said anode plate for said second battery cell adapted to conduct electricity between said first battery cell and said second battery cell.

* * * * *